(12) United States Patent
Buttrick et al.

(10) Patent No.: US 9,314,974 B2
(45) Date of Patent: Apr. 19, 2016

(54) METHOD AND APPARATUS FOR FABRICATING CONTOURED LAMINATE STRUCTURES

(71) Applicant: The Boeing Company, Chicago, IL (US)

(72) Inventors: James N. Buttrick, Seattle, WA (US); Dennis Wayne Stewart, Toutle, WA (US); Andrew E. Modin, Daniel Island, SC (US); David Paul Banks, Lake Stevens, WA (US); Edoardo Depase, Manhattan Beach, CA (US); Jesus Sanchez, Maunabo, PR (US)

(73) Assignee: THE BOEING COMPANY, Chicago, IL (US)

( * ) Notice: Subject to any disclaimer, the term of this patent is extended or adjusted under 35 U.S.C. 154(b) by 232 days.

(21) Appl. No.: 13/901,813

(22) Filed: May 24, 2013

(65) Prior Publication Data

US 2014/0190625 A1    Jul. 10, 2014

Related U.S. Application Data

(60) Provisional application No. 61/749,881, filed on Jan. 7, 2013.

(51) Int. Cl.
*B29C 70/54* (2006.01)
*B29C 70/38* (2006.01)
*B29C 69/00* (2006.01)
*B29D 99/00* (2010.01)

(52) U.S. Cl.
CPC ............... *B29C 69/00* (2013.01); *B29C 70/38* (2013.01); *B29C 70/541* (2013.01); *B29D 99/0003* (2013.01); *Y10T 156/1002* (2015.01)

(58) Field of Classification Search
None
See application file for complete search history.

(56) References Cited

U.S. PATENT DOCUMENTS

| 5,352,306 | A | 10/1994 | Grimshaw et al. |
| 7,670,525 | B2 | 3/2010 | Weidmann et al. |
| 7,943,076 | B1 | 5/2011 | Hawkins et al. |
| 8,151,529 | B2 | 4/2012 | Weidmann et al. |
| 8,349,105 | B2 | 1/2013 | Kehrl et al. |
| 8,551,380 | B2 | 10/2013 | Hawkins et al. |
| 8,632,653 | B2 | 1/2014 | Brown et al. |
| 2006/0249868 | A1 | 11/2006 | Brown et al. |
| 2007/0229805 | A1 | 10/2007 | Engelbart et al. |
| 2009/0261199 | A1 | 10/2009 | McCarville et al. |

(Continued)

FOREIGN PATENT DOCUMENTS

DE    102010039955 A1 *  3/2012
WO    WO2006119002 A2    11/2006
WO    WO2009129007 A2    10/2009

OTHER PUBLICATIONS

Kehrl et al., "Curved Composite Frames and Method of Making the Same," U.S. Appl. No. 13/684,988, filed Nov. 26, 2012, 64 pages.

(Continued)

*Primary Examiner* — Barbara J Musser
(74) *Attorney, Agent, or Firm* — Yee & Associates, P.C.

(57) ABSTRACT

A plurality of identical fabrication modules are linked together and configurable to fabricate any of a plurality of differing laminate structures in a family of structures having common features. Each of the fabrication modules is locally adapted to fabricate a section of the laminate structure on a corresponding tool. A controller controls and coordinates automated operation of the fabrication modules.

43 Claims, 10 Drawing Sheets

(56) References Cited

U.S. PATENT DOCUMENTS

| | | |
|---|---|---|
| 2009/0263618 A1 | 10/2009 | McCarville et al. |
| 2010/0024971 A1 | 2/2010 | Benson et al. |
| 2011/0097554 A1 | 4/2011 | Kehrl et al. |
| 2011/0303350 A1* | 12/2011 | Brown .................. B29C 63/04 156/216 |
| 2012/0006475 A1 | 1/2012 | Colombo et al. |
| 2012/0076973 A1 | 3/2012 | Guzman et al. |
| 2012/0121866 A1 | 5/2012 | Hawkins et al. |
| 2013/0084434 A1 | 4/2013 | Kehrl et al. |
| 2013/0153154 A1* | 6/2013 | Boge ...................... B25J 5/02 156/510 |
| 2014/0065354 A1 | 3/2014 | Smith, Jr. et al. |
| 2015/0041048 A1 | 2/2015 | Anderson et al. |

OTHER PUBLICATIONS

Smith, Jr. et al., "Method of Fabricating a Curved Composite Structure Using Composite Prepreg Tape," U.S. Appl. No. 13/736,021, filed Jan. 7, 2013, 42 pages.

International Search Report and Written Opinion, dated Feb. 21, 2014, regarding Application No. PCT/US2013/071124, 11 pages.

International Preliminary Report on Patentability, dated Jul. 7, 2015, regarding Application No. PCT/US2013/071124, 7 pages.

* cited by examiner

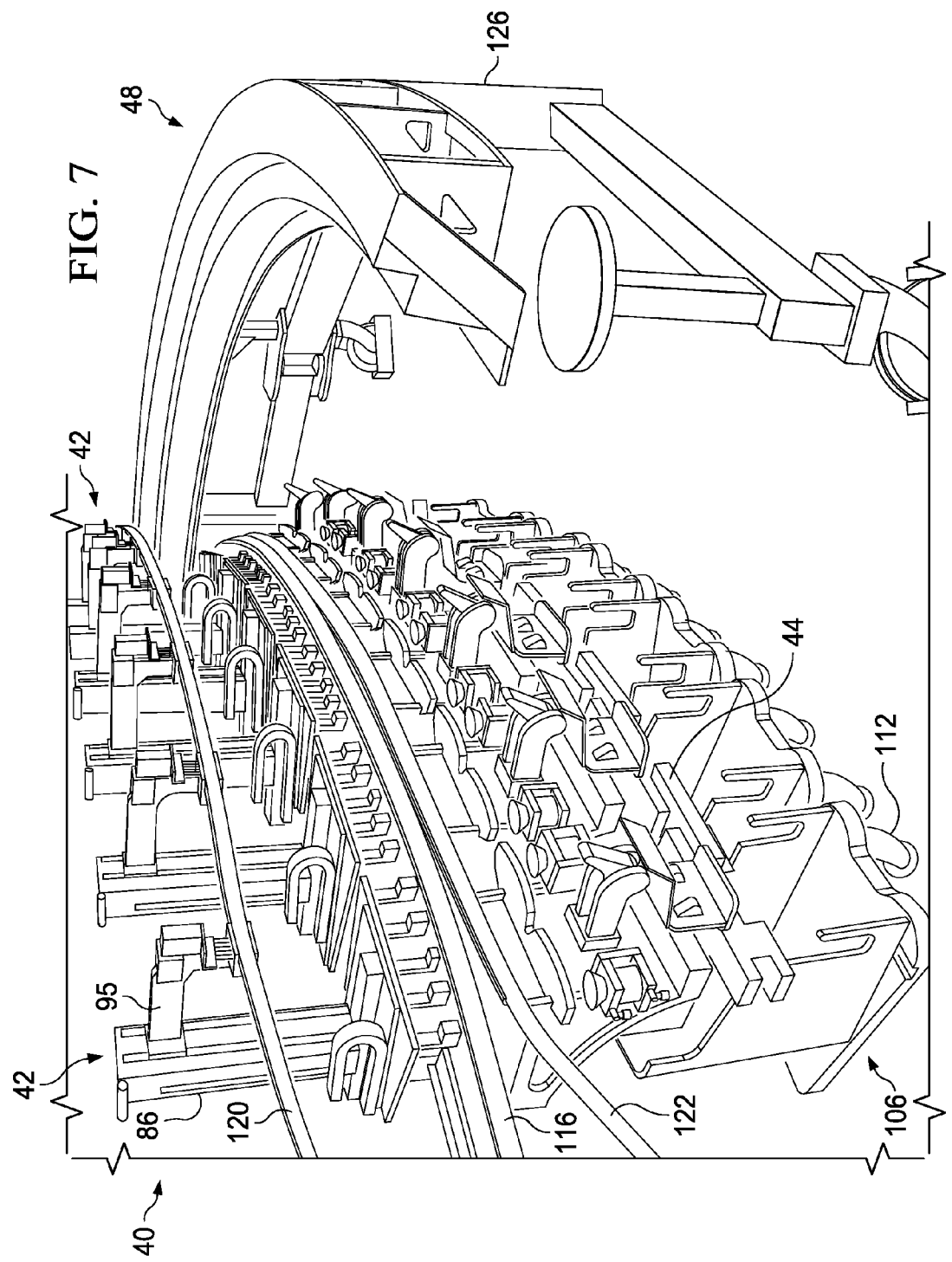

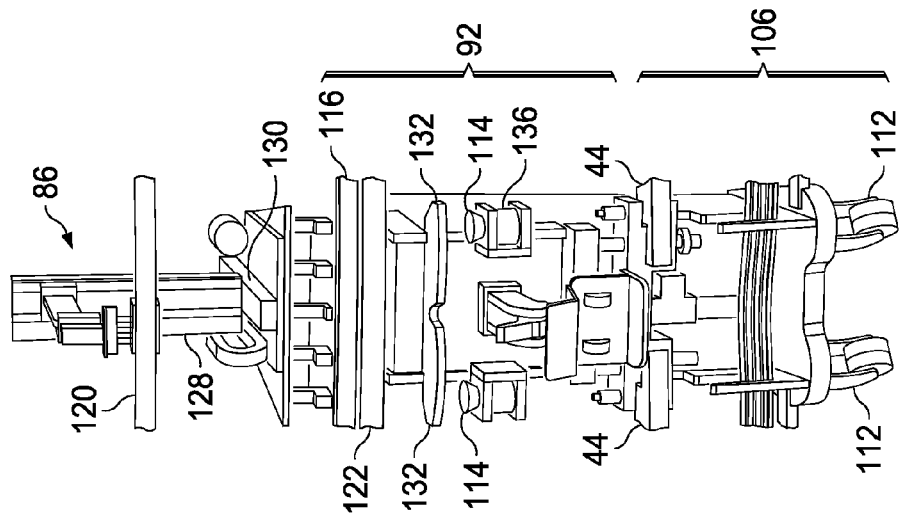
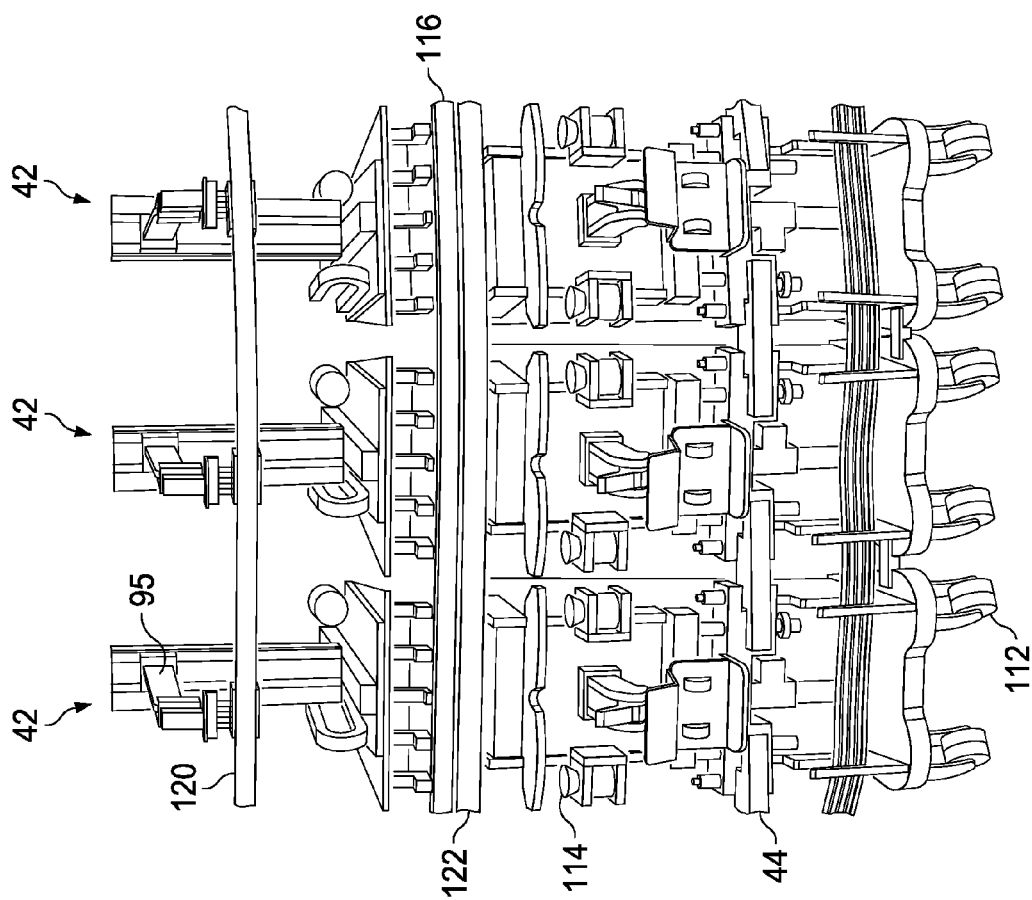

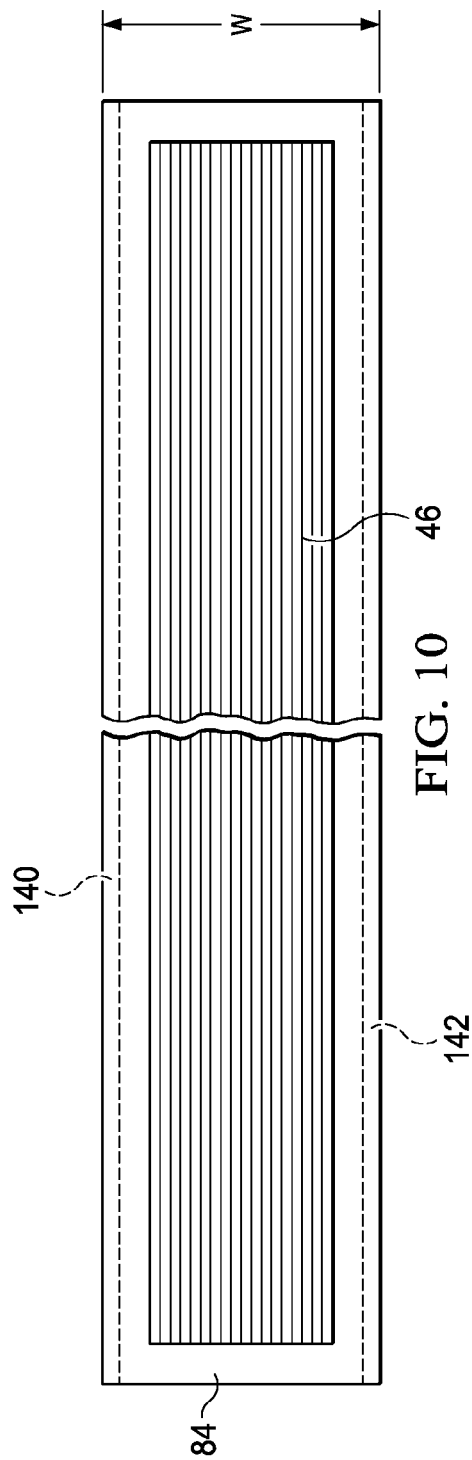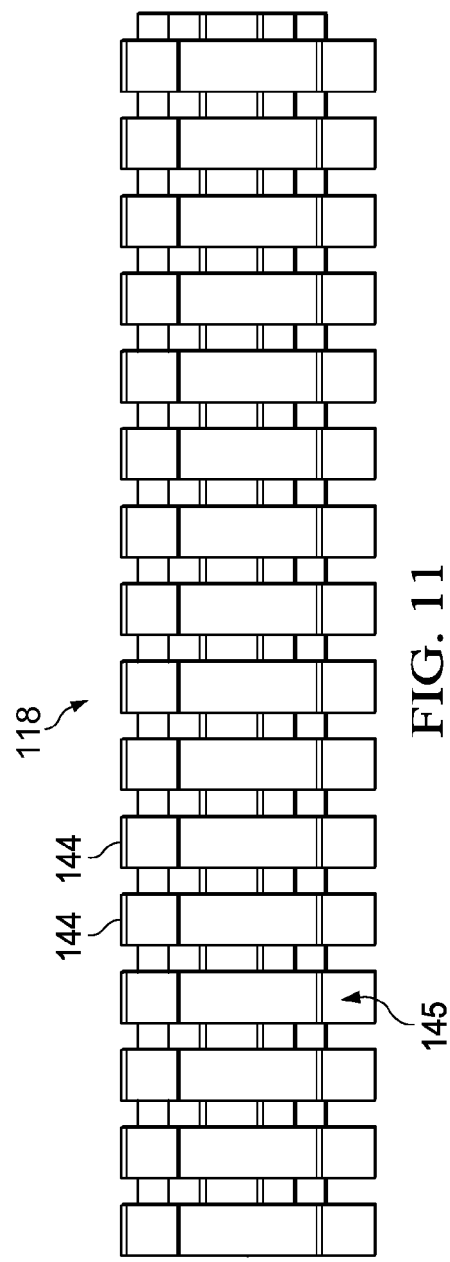

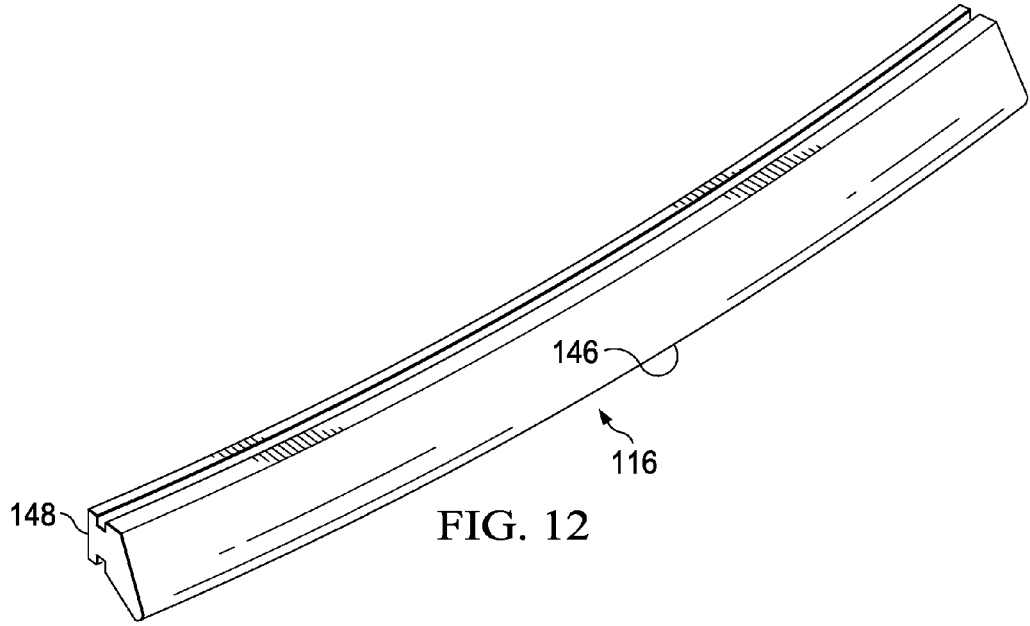
FIG. 12
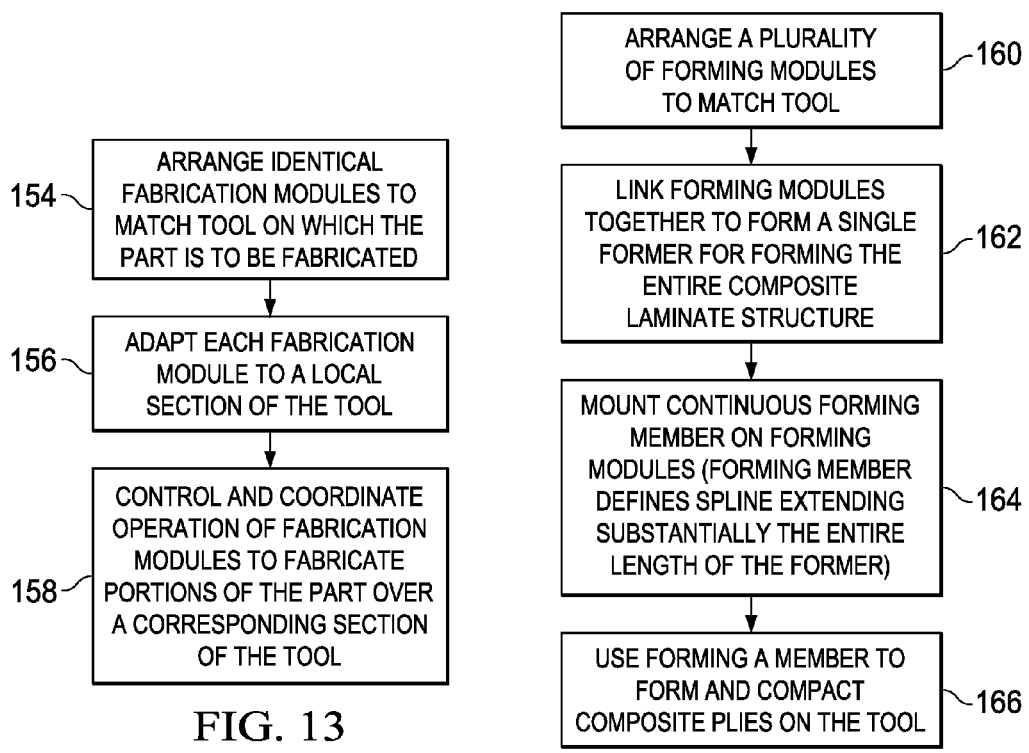
FIG. 13
FIG. 14

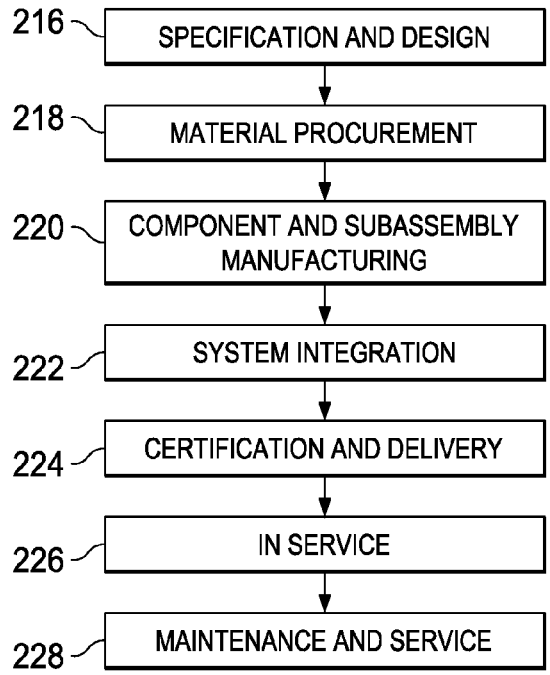
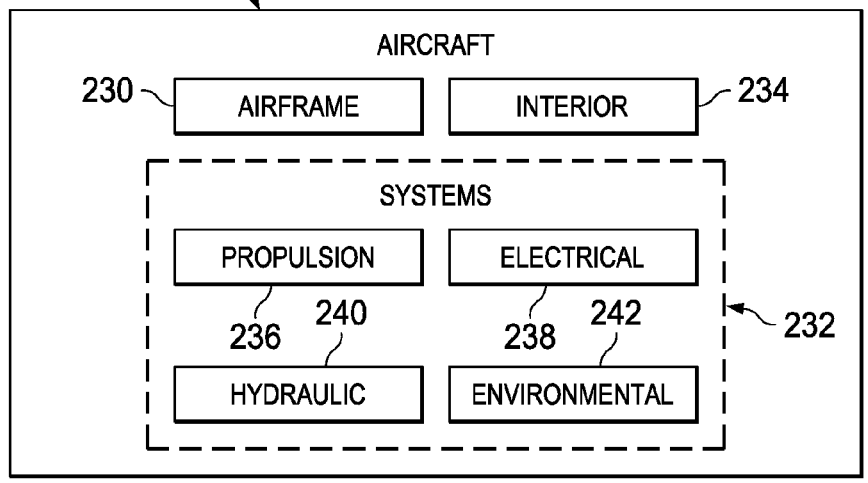

METHOD AND APPARATUS FOR FABRICATING CONTOURED LAMINATE STRUCTURES

CROSS REFERENCE TO RELATED APPLICATIONS

This application claims the benefit of Provisional U.S. Patent Application No. 61/749,881 filed Jan. 7, 2013, which is incorporated by reference herein in its entirety.

BACKGROUND INFORMATION

1. Field

The present disclosure generally relates to fabrication of laminates, especially those that are contoured, and deals more particularly with a method and apparatus for automated layup and forming of different laminate structures within a family of structures having common features.

2. Background

Composite structures, especially those having contours, sometimes have features that require that the structure be formed of multiple parts. For example, in the aircraft industry, contoured composite fuselage barrel frame sections may be formed using a two-piece assembly comprising a channel section frame and a shear tie, mechanically fastened together. More recently, one-piece composite frame sections have been proposed that employ braided composites, however this fabrication approach is time consuming and labor intensive, and may result in a frame that is heavier than desired. The problem of fabricating one-piece frame sections is more difficult in high production rate environments where production flow times may be important to achieve manufacturing efficiencies.

Accordingly, there is a need for a method and apparatus for producing one-piece laminate structures, especially those that are contoured, which reduce labor and assembly time through automation. There is also a need for a method and apparatus for producing different laminate structures within a family of structures having common features in order to reduce material and labor costs while increasing production rates. Furthermore, there is a need for a method and apparatus for fabricating laminate structures using certain material forms such as unidirectional pre-preg tape, that may not be producible using conventional, manual fabrication methods.

SUMMARY

The disclosed embodiments provide a method and apparatus for producing different composite laminate structures within a family of structures having common features. The apparatus comprises an automated, reconfigurable composite forming system especially designed to form unidirectional pre-preg tape in the production of structural members, such as aircraft fuselage frames. The apparatus comprises a plurality of substantially identical forming modules linked together to form a single former that may be reconfigured to conform to a wide range of tools defining corresponding structural shapes. Each of the forming modules possesses the ability to locally adapt or transform to the unique design, shape or features of the tool. In one aircraft application, the apparatus may be employed to fabricate multi-ply composite frame sections having a Z cross-sectional shape, by laying up, forming and compacting each ply of the frame section. The plies are formed from an inner chord outwardly to an outer chord, sometimes referred to as a shear tie. Each of the forming modules adapts to the local shape of the tool. The modules are linked together in a manner to form a single former that adjusts to the entire tool. Different tool arc lengths can be accommodated by adding or removing forming modules. It is not necessary that the forming modules exactly match the total arc length of a tool in those cases where the structure is contoured. The apparatus employs an adaptive control system based on a generic structural shape profile of structures within a family of structures. The adaptive control system forms each ply of the structure based on a combination of force feedback and positional control. Each forming module has two servo axes and employs force feedback on one of these two axes at a time. The use of force feedback is dependent upon the area of the structure being formed. During the forming process, the feedback switches back and forth between the two axes. Switching between the two axes is controlled by the adaptive system and is determined by generic shape parameters of the structure being formed. Reliance on a generic motion profile allows the apparatus to form any of a multiplicity of unique structures, ply-by-ply without the need for NC (numerical control) programming. The apparatus is easily scalable to fabricate structures of different sizes within a family of structures by adding or removing forming modules, and arranging the modules to substantially match corresponding tool shapes.

According to one disclosed embodiment, a system is provided for fabricating a plurality of unique parts. The system comprises a plurality of unique lay-up tools respectively corresponding to the plurality of parts to be fabricated and, a plurality of former modules configured to be combined together to define a plurality of unique formers respectively corresponding to the plurality of parts and the plurality of lay-up tools. Each of the formers is adapted for laying down material on a corresponding one of the lay-up tools to form a corresponding one of the parts. The former modules are substantially identical, and each of the plurality of unique formers is configured by coupling each of the substantially identical former modules to the corresponding unique lay-up tool. The former modules are linked together and are mounted on bases allowing the former modules to move in multiple directions. Each of the former modules includes a forming head adapted to form the material on a corresponding one of the lay-up tools. Each of the forming heads includes compliance. The part may be a laminated structure, and the laminated structure may be a carbon fiber reinforced plastic.

According to another disclosed embodiment, apparatus is provided for fabricating each of a plurality of differing laminate structures in a family of structures having common features. The apparatus comprises a plurality of separate fabrication modules each locally adapted to fabricate a section of the laminate structure on a corresponding tool. The fabrication modules are reconfigurable to fabricate each of the laminate structures in the family thereof. The apparatus also includes a controller for controlling and coordinating automated operation of the fabrication modules. The apparatus may further comprise a forming member adapted for forming laminate plies over the tool. The forming member extends along a length of the fabrication modules, and is mounted on each of the fabrication modules for movement over the tool along at least two axes. The forming member is continuous along the length of the fabrication modules. The forming member is controlled along two axes, but has a shape that adapts to changes between different areas of the structure being formed, such as, in the case of a one-piece aircraft fuselage frame, between an inner chord radius and a shear tie radius of the frame. Each of the fabrication modules includes a track in which a portion of the forming member is locally mounted. A single forming member may be used to fabricate a particular structure, however the forming member is removably mounted in the track to allow interchangeability of a plurality of forming members respectively having different shapes to fabricate differently shaped structures. The track allows for lateral (or tangential) slip of the forming member relative to each module as the arc length of the structure changes as the forming member moves over the structure. The forming member is adapted to sweep laminate plies over the tool, and includes compliance. Each of the fabrication modules includes a clamp adapted for clamping a portion of a laminate ply against a portion of the tool. Each of the fabrication modules includes a powered drive coupled with the forming member for sweeping the forming member over the laminate plies and compacting laminate plies on the tool. The apparatus may further comprise a flexible ply carrier adapted to hold at least one laminate ply thereon, wherein each of the fabrication modules includes a pair of spaced apart tracks adapted to releasably hold the ply carrier, and a ply carrier control assembly for holding the ply carrier in tension as the forming member forms the ply over the tool. The forming member is engageable with the ply carrier to sweep the ply carrier along with the ply thereon over the tool, and the ply carrier control assembly includes drives for adjusting the position ply carrier along two axes. Each of the fabrication modules further includes a force sensor for sensing a level of force applied to the laminate plies by the forming member, and a position sensor for sensing the position of the forming member. Each of the fabrication modules further includes a clamp for clamping the fabrication module to the tool. The apparatus may also comprise linkage between the fabrication modules for coupling the fabrication modules together and for aligning the fabrication modules relative to the tool. The linkage is configured to allow the forming modules to rotate along an arc that is substantially the same as the retracted arc of the continuously extending forming member. The fabrication modules are substantially identical and interchangeable with each other. The apparatus also includes a central controller for controlling and coordinating the operation of the fabrication modules to collectively fabricate the laminate structure.

According to still another embodiment, a method is provided of fabricating a plurality of differing parts in a family of parts having common features, wherein each of the parts is fabricated using a unique tool. The method comprises arranging a plurality of separate, substantially identical fabrication modules to substantially match a tool on which one of the parts is to be fabricated, and adapting each of the fabrication modules to a local section of the tool. The method further comprises controlling and coordinating operation of the fabrication modules to fabricate portions of the part over a corresponding section of the tool. Arranging the fabrication modules includes moving each of the fabrication modules into proximity to the tool, and linking the fabrication modules together. The method may further comprise clamping each of the fabrication modules to the tool. Adapting each of the fabrication modules includes learning, by each of the fabrication modules, the location of surfaces on the tool on which the part is to be fabricated. The method may also comprise sweeping materials across the surfaces of the tool using a forming member, and using the forming member to learn the location of the surfaces on the tool. Learning the location of the surfaces includes sensing the position of the forming member as the forming member sweeps materials across the surfaces of the tool, and recording the sensed position of the forming member. Adapting each of the fabrication modules includes adjusting the elevation of the fabrication modules to a common waterline. The method may further comprise forming a continuous spline along all of the fabrication modules. Forming the continuous spline includes mounting a continuous forming member along substantially the entire length of the fabrication modules. Each of the fabrication modules may be a laminate ply former module for forming a local section of a ply. Arranging the fabrication modules includes linking the fabrication modules together to form a single laminate ply former.

According to another disclosed embodiment, a method is provided of fabricating a composite laminate structure. The method comprises arranging a plurality of substantially identical forming modules to generally match a tool on which composite plies are to be formed to fabricate the laminate structure, and linking the forming modules together to form a single former for forming an entire composite laminate structure. The method further comprises mounting a continuous forming member on the forming modules, the continuous forming member defining a spline extending substantially the entire length of the former, and using the forming member to form and compact the composite plies on the tool. The method may also include placing the composite plies on a ply carrier. The forming member is used to engage and sweep the ply carrier along with the plies over the tool.

According to still another disclosed embodiment, a forming module is provided for forming a composite laminate part over a tool. The forming module comprises a base and a ply carrier control assembly adapted for controlling the position of a flexible ply carrier on which composite resin plies are mounted. The forming module further comprises a head section mounted on the base and adapted for automatically forming the composite resin plies from the ply carrier onto the tool. The base is adapted to move over a supporting surface, and the head section includes adaptive control for learning a profile of the tool. The forming module may further include a clamp for clamping the head section to the tool, and an automatically controlled forming member for forming the plies over the tool.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 7 is an illustration of a perspective view of the apparatus, prior to being moved into proximity to and clamped to a tool, a ply carrier not shown for clarity.

FIG. 8 is an illustration of a front perspective view of three adjacent fabrication modules forming part of the apparatus shown in FIG. 7.

FIG. 9 is an illustration of a front perspective view of one of the fabrication modules shown in FIG. 8, depicting additional details of the module.

FIG. 10 is an illustration of a plan view of a ply carrier having a ply mounted thereon.

FIG. 11 is an illustration of a front view of a nosepiece track forming part of each of the fabrication modules shown in FIGS. 7-9.

FIG. 12 is an illustration of a perspective view of a portion of the length of a nosepiece adapted to be mounted on the nosepiece track shown in FIG. 11.

FIG. 13 is an illustration of a flow diagram of a method of fabricating each of a plurality of different parts in a family of parts having common features.

FIG. 14 is an illustration of a flow diagram of a method of fabricating a composite laminate structure.

FIG. 18 is an illustration of a flow diagram of aircraft production and service methodology.

FIG. 19 is illustration of a block diagram of an aircraft.

DETAILED DESCRIPTION

Figure 1:
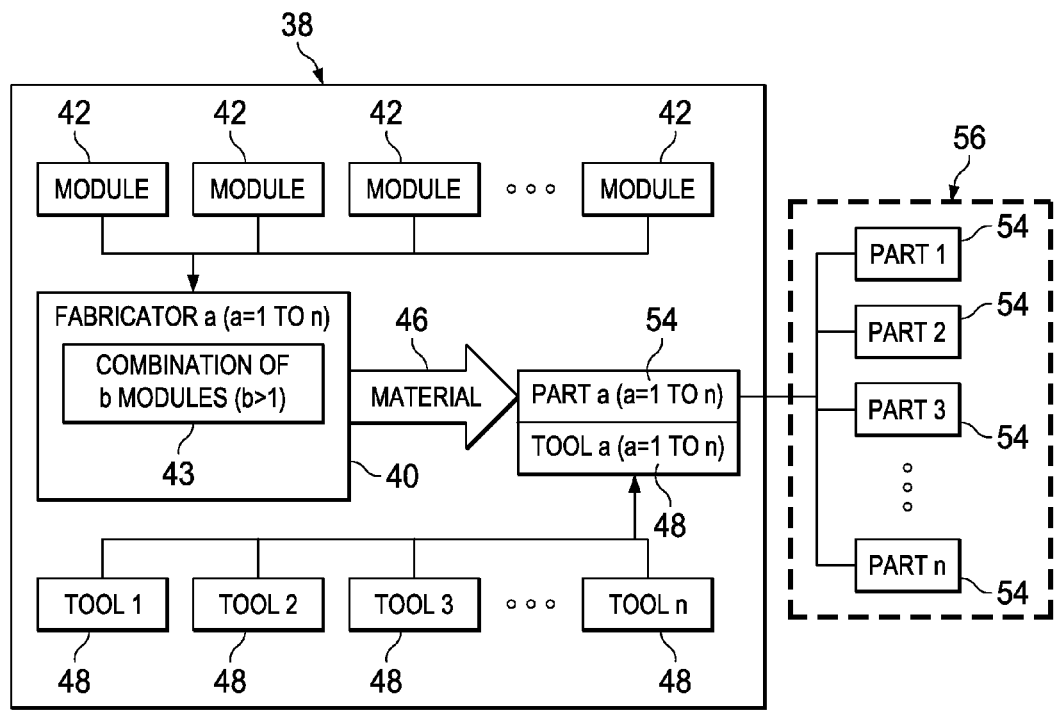
FIG. 1 is an illustration of a block diagram of a system for fabricating any of a plurality of parts within a family having common features using corresponding tools and fabrication modules according to the disclosed embodiments.

Referring first to FIG. 1, a system 38 is provided for fabricating any of a plurality of unique parts 54 within a family 56 of parts 54 having common features or characteristics. The unique parts 54 may be fabricated using corresponding, unique tools 48, which may be layup tools, and a combination 43 of fabrication modules 42, sometimes hereinafter also referred to as former modules 42 or forming modules 42, arranged and configured to form a fabricator 40, sometimes hereinafter also referred to as a former 40. As will be discussed below in more detail, the fabrication modules 42 may be identical and interchangeable. The number and arrangement of the fabrication modules 42 is matched to the particular tool 48 required to fabricate a particular part 54. The fabricator 40 fabricates the part 54 by placing and forming material 46 on the particular tool 48. Forming material 46 may sometimes hereinafter also be referred to as composite plies 46, pre-preg plies 46, or plies 46. In one application, the part 54 may be a multi-ply composite laminate, and the material 46 may be a carbon fiber reinforced plastic (CFRP). Part 54 may sometimes hereinafter also referred to as composite laminate 54, composite laminate structure 54, or structure 54.

Figure 2:
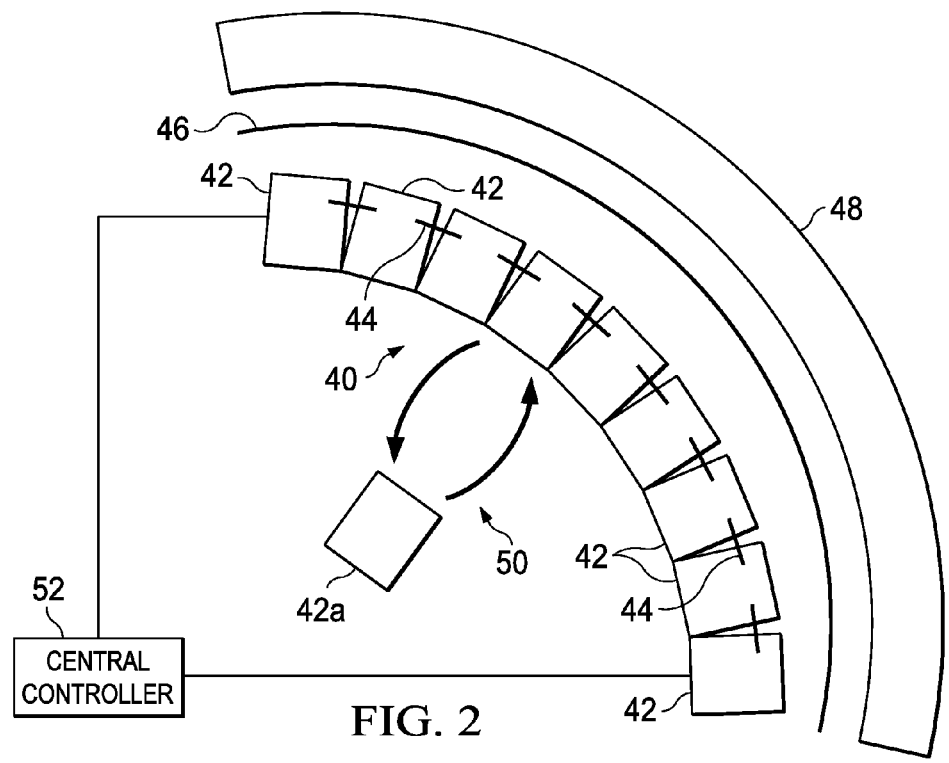
FIG. 2 is an illustration of a diagrammatic plan view of apparatus for fabricating contoured composite laminate structures.

Attention is now directed to FIG. 2 which illustrates one embodiment of the system 38 shown in FIG. 1. In this example, a plurality of former modules 42 are arranged in a configuration generally matching the shape of a layup tool 48 on which a particular part (not shown in FIG. 2) is to be formed. In the illustrated example, the former modules 42 are arranged in an arc shape that substantially matches the arc shaped layup tool 48, however, a variety of other shapes are possible. The former 40 forms and laminates composite plies 46 on the tool 48. The former modules 42 are rigidly connected with each other by linkage 44 to form a former 40. The former 40 self-adapts and aligns itself to each particular tool 48 required to make a particular part 54 (FIG. 1). The former modules 42 may be substantially identical to each other and are thus interchangeable 50 with modules 42a purposes of repair, replacement or reconfiguration of the former 40 to form unique parts within a family of parts having common features or characteristics. Each of the former modules 42 is coupled with a central controller 52 which may comprise a special or general purpose computer, or a PLC (programmable logic controller). The central controller 52 controls and coordinates the automated operation of the former modules 42.

Figure 3:
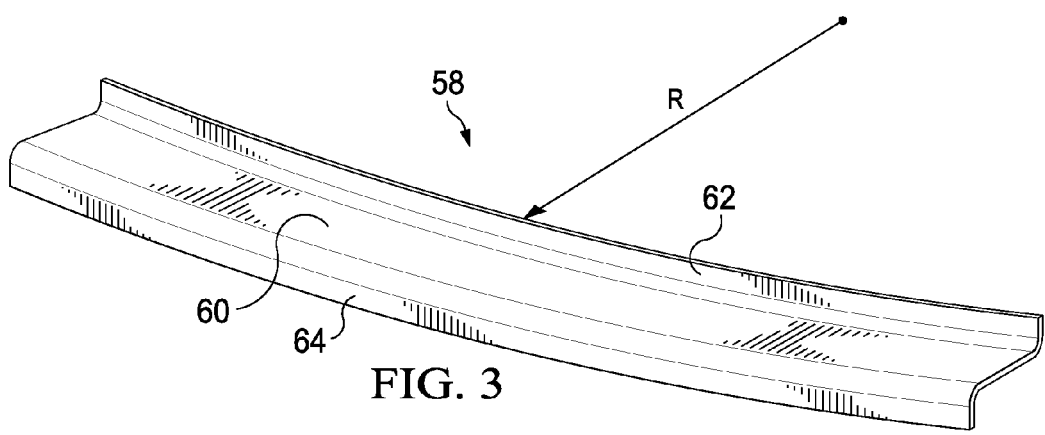
FIG. 3 is an illustration of a perspective view of a composite laminate frame section having a Z-shaped cross-section.
Figure 4:
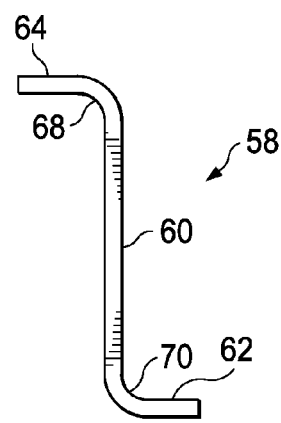
FIG. 4 is an illustration of a cross-sectional view of the frame section shown in FIG. 3.

As previously mentioned, the former 40 may be used to form a variety of composite parts within a family of parts having common features or characteristics. For example, referring to FIGS. 3 and 4, the former 40 may be used to form and laminate a composite frame section 58 used in an aircraft fuselage (not shown). The frame section 58 is curved or contoured along its length and has a radius "R". The former 40 may be used to form any of a range of frame sections 58 having different arc lengths, radii or other common features within a family of frame sections 58. These features, including contours or radii, may be continuous or non-continuous along the length of the frame section 58 or other parts being formed. The frame section 58 is generally Z-shaped in cross section, and comprises an inner chord flange 62 and an outer chord flange 64 (sometimes also referred to as a shear tie 64). The inner and outer chord flanges 62, 64 respectively are connected by a central web 60. The shear tie 64 is connected to the web 60 by a shear tie radius 68, and the inner chord flange 62 is connected to the web 60 by an inner chord radius 70. While a Z-shaped frame section 58 has been illustrated in the exemplary embodiment, it should be noted that the disclosed method and apparatus may be employed to fabricate composite laminate parts having a variety of other cross-sectional shapes, including but not limited to L, I and C cross-sectional shapes.

Figure 5:
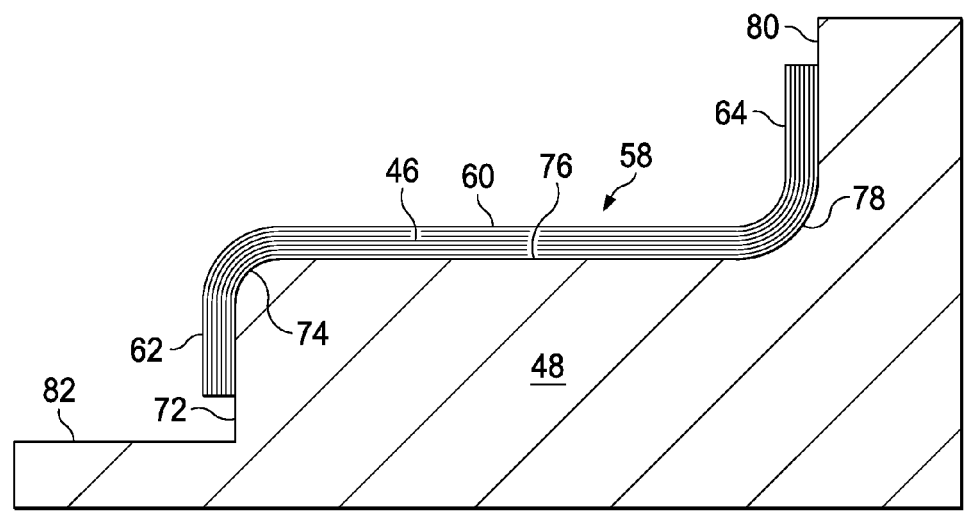
FIG. 5 is an illustration of an end view of a tool having the frame section shown in FIGS. 3 and 4 laid up and compacted thereon.

Referring now to FIG. 5, the former 40 forms and laminates composite pre-preg plies 46 on a tool 48. The tool 48 has tool features matching the frame section 58. In this example, the tool 48 includes an inner chord tool flange 72, an inner chord tool radius 74, a web tool surface 76, shear tie tool radius 78 and an outer chord tool flange 80. The tool 48 also includes a clamping flange 82 extending around its entire inner chord. Other types of layup tools 48 may be used in connection with the disclosed method and apparatus to form other types and sizes composite laminate parts, having cross-sectional shapes other than Z cross-sections. Moreover, the illustrated tool 48 may be employed to layup a curved composite laminate frame section or other part having an L-shaped cross-section.

Figure 6:
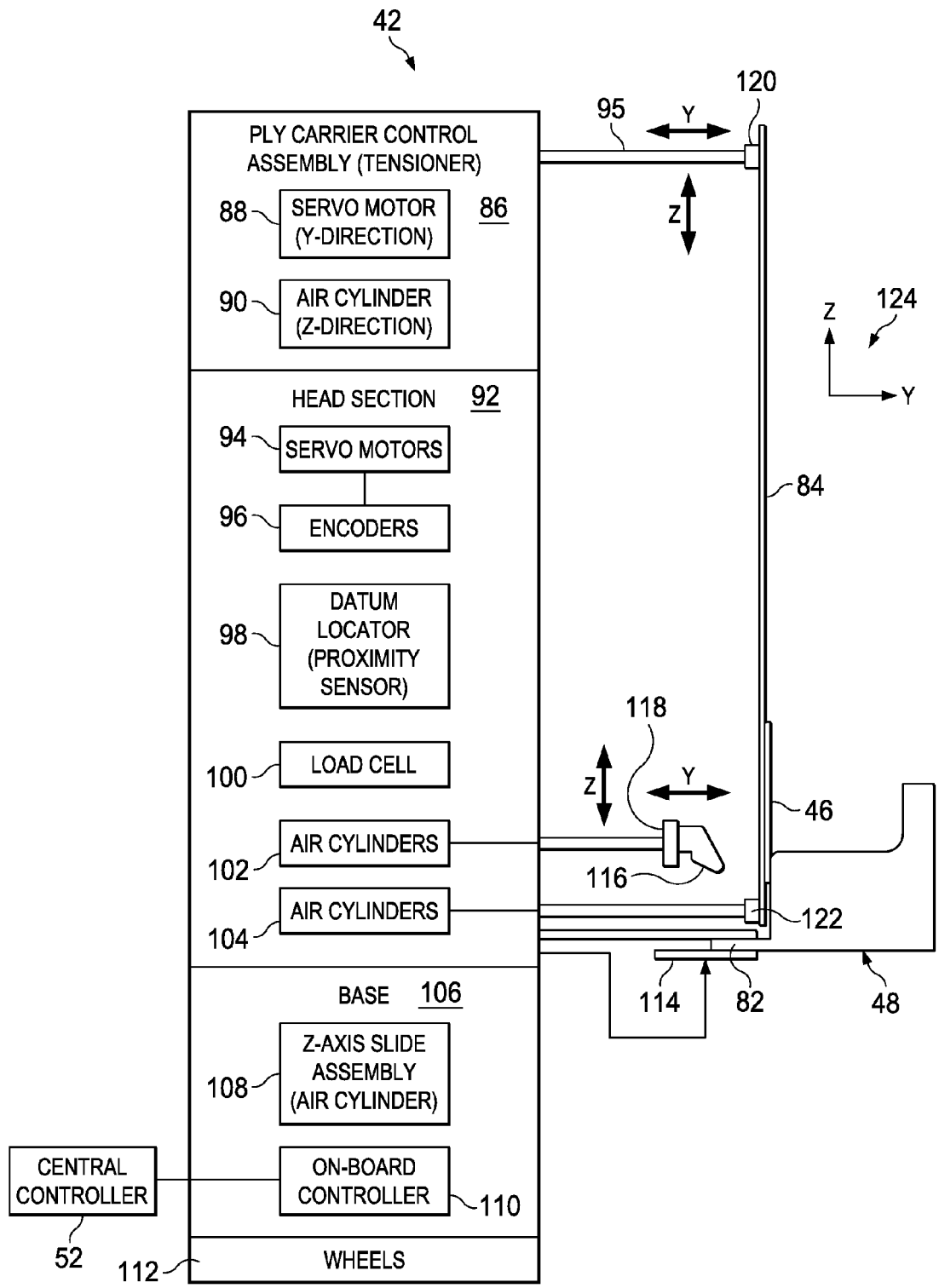
FIG. 6 is an illustration of a functional block diagram of the apparatus of FIG. 2, shown clamped to the tool illustrated in FIG. 5.

Attention is now directed to FIGS. 6-9 which illustrate one embodiment of the former 40. FIG. 6 is a functional block diagram showing one of the former modules 42, in the process of laying up a single pre-preg ply 46 on the tool 48. The ply 46 is supported in a desired, or indexed position on a ply carrier 84 discussed below in more detail. The ply carrier 84 is held along its upper edge on a carrier support track 120 at the end of a support arm 95 forming part of the former module 42. The former module 42 broadly comprises a ply carrier control assembly 86 mounted on a head section 92 which is supported on a movable base 106. The base 106 may include an on-board controller 110 that is coupled with the central controller 52 (FIG. 2) previously discussed. Wheels or casters 112 on the base 106 allow the former module 42 to be moved along a supporting surface such as a factory floor (not shown) in any direction in order to allow the former module 42 to be positioned in a desired configuration with other former modules 42, such that the collective geometry of the former modules 42 substantially matches that of the tool 48. The base 106 includes a Z-axis slide assembly 108 which moves the head section 92 and the ply carrier control assembly 86 in the vertical direction, or Z-axis within a machine coordinate system 124.

The ply carrier control assembly 86 controls the attitude of, and tension on the ply carrier 84 in order to support and continuously reposition position the ply 46 as it is being formed onto the tool 48. The ply carrier control assembly 86 may include a motorized drive system which moves the support arm 95 and thus the carrier support track 120 along both the Y and Z axes. For example, the motorized drive system may comprise a servo-motor 88 for driving the carrier support track 120 along the Y axis, and an air cylinder 90 for driving the support arm 95 and the carrier support track 120 along the Z axis. Other drive arrangements are possible.

The head section 92 includes a ply forming member 116, referred to hereinafter as a nosepiece 116, which engages the ply carrier 84 and follows the shape of the tool 48 to form and compact the ply 46 onto the tool 48. The nosepiece 116 is removably mounted in a nosepiece track 118 discussed later in more detail. The nosepiece 116 extends continuously along the entire arc length of the tool 48, and effectively forms a spline between the forming modules 42. Both the nosepiece 116 and the nosepiece track 118 may be flexible along their length to conform to the curvature and other features of the tool 48. The nosepiece track 118 is coupled with a motorized drive system which may comprise, for example and without limitation, a plurality of air cylinders 102 which move the nosepiece 116 in the Y direction.

Movement of the nosepiece 116 in the Z direction may be effected through movement of the head section 92 by the Z-axis slide assembly 108 on the base 106. The head section 92 further includes an inner chord clamp 122 driven in the Y direction by air cylinders 104 or similar motor drives. The inner chord clamp 122 clamps the lower edge of the ply carrier 84 and the ply 46 against the inner chord tool flange 72 (FIG. 5) while the ply 46 is being formed over other surfaces of the tool 48. The head section 92 may include a datum locator which may comprise, for example and without limitation, a proximity sensor, as well as servo-motors 94 and encoders 96. The servo-motors 94 and the encoders 96 may be used to determine the position of the nosepiece 116, and thus the location of surfaces on the tool 48, during an adaptive tool learning process discussed below. One or more load cells 100 on the head section 92 may be used to sense the amount of force being applied by the nosepiece 116 during both the learning and ply forming processes.

As can be appreciated from the foregoing description, the former 40 provides 2-axis (Y-Z) controlled sweeping of prepreg plies with 2-axis coordinated motion. However, motion is not limited to 2 axes. For example, the required motion may be accomplished using multiple robots (not shown) operating in unison. The adaptive control employed by former 40 allows the former modules 42 to adapt to each particular tool 48 used to make any of a number of parts within a family of parts, by using a generic profile of the parts in the family, and force feedback to learn and follow the specific tool and part geometry. The adaptive control used by the former 40 also automatically adapts or adjusts to the shape of the part 54 as the thickness of the part 54 increases with layup of each successive ply 46. The use of a combination of position control and motor torque feedback allow constant pressure to be applied by the nosepiece 116 to the part 54 during the forming process.

As shown in FIG. 7, the tool 48 may be supported on a wheeled cart 126 for movement into proximity with a former 40 comprising a plurality of former modules 42 that have been configured to substantially match the geometry of the tool 48. The former modules 42 are rigidly connected together by mechanical linkages 44 (see FIG. 8) between bases 106 of adjacent former modules 42. Referring particularly to FIG. 9, the ply carrier control assembly 86 (FIG. 6) includes a Z-axis slide support allowing movement of the support arm 95 (see FIGS. 6-8) along the Z axis, and a slide 130 providing movement of the support arm 95 along the Y-axis. Tool clamps 114 driven by air cylinders 136 function to clamp the flange 82 (FIG. 5) of the tool 48 against an index plate 132 which establishes a common "waterline" or reference datum, for all of the former modules 42, automatically aligning all of the former modules 42 relative to the tool 48. Each of the former modules 42 includes a slight amount of "float" that allows each of the head sections 92 to align to the tool waterline and then lock into position. As a result of this feature, the tool 48 does not have to be located on a precise platform, and the forming process can be carried out on standard factory floors that may be uneven. Although not shown in the drawings, the tool 48 and/or the plies 46 may be heated during a layup process in order to soften the resin and facilitate forming. Heating may be achieved using any suitable technique, including but not limited to infrared radiation using IR heat lamps.

Referring to FIG. 10, the ply carrier 84 may be formed of a flexible, durable material that may be stretchable in one or more directions, for example along its width "W". One or more plies 46 may be placed in preselected, indexed positions on the ply carrier 84 prior to the ply carrier 84 being loaded onto the former 40. The ply carrier 84 may include upper and lower carrier guides 140, 142 that are used to removably mount the ply carrier on the former 40. For example, the upper carrier guide 140 may include individual guide members (not shown) on the back of the ply carrier 84 which are received within a groove (not shown) in the carrier support track 120. Similarly, the lower carrier guide 142 may comprise a continuous guide strip (not shown) on the back of the ply carrier 84 which is received within a groove (not shown) extending along the inner chord clamp 122.

FIG. 11 illustrates further details of one embodiment of the nosepiece track 118. In this example, the nosepiece track 118 comprises a plurality of spaced apart segments 144 which allow the nosepiece track 118 to flex as required to permit the nosepiece 116 to conform to features of the tool 48. As shown in FIG. 12, the nosepiece 116 includes an outer forming tip 146 that has a profile suited for the particular application and features of the tool 48. The nosepiece 116 is mounted on the nosepiece track 118 by a T-shaped guide 148 that is slidably received within a groove 145 in the nosepiece track 120. The nosepiece 116 may be removably installed in the nosepiece track 120 by sliding it lengthwise through the groove 145. Thus, nosepieces 116 having different sizes and shapes are interchangeable, allowing selection of a nosepiece 116 that is suitable for the application and tool shape. The nosepiece 116 may be compliant in order to better conform it to features of the tool 48 during the forming process.

FIG. 13 broadly illustrates the steps of a method of fabricating each of the plurality of differing parts 54 in a family 56 of parts 54 having common features, wherein each of the parts 54 is fabricated using a unique tool 48. Beginning at 154, identical fabrication modules 42 are arranged to match a tool 48 in which the part 54 to be fabricated. At 156, each of the fabrication modules 42 is adapted to a local section of the tool 48. At 158, operation of the fabrication modules 42 is controlled and coordinated to fabricate portions of the part 54 over a corresponding section of the tool 48.

FIG. 14 broadly illustrates the steps of a method of fabricating a composite laminate structure 54. Beginning at 160, a plurality of forming modules 42 are arranged to match a tool 48 on which the structure 54 is to be formed. At 162, the modules 42 are linked together to form a single former 40 for forming the entire composite laminate structure 54. At 164, a continuous forming member 116 is mounted on the forming modules 42. The forming member 116 defines a spline extending substantially the entire length of the former 40. At 166, the forming member 116 is used to form and compact composite plies 46 on the tool 48.

Figure 15:
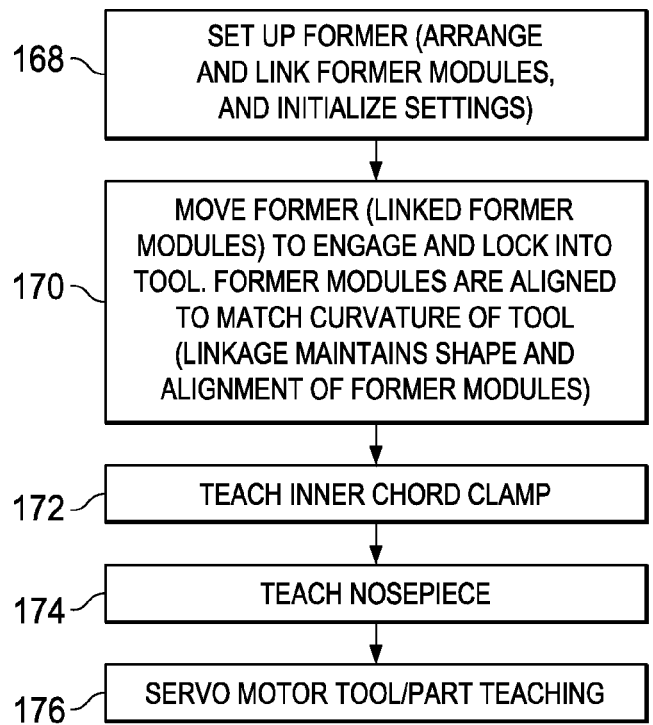
FIG. 15 is an illustration of a flow diagram of the method used to set up and teach each of the fabrication modules.

Attention is now directed to FIG. 15 which broadly illustrates the steps that may be carried out to set up and teach each of the forming modules 42 in preparation for a forming process using a particular tool 48. At 168, former 40 is set up by arranging and linking former modules 42 together using linkages 44, and initializing settings of each of the modules 42. Then, at 170, the linked former modules 42 are moved to engage and lock onto the tool 48. The tool clamps 114 (FIG. 9) clamp the flange 82 (FIG. 5) of the tool 48 against the tool waterline index plate 132. The former modules 42 are aligned to match the curvature of the tool 48, and the linkage 44 maintains the shape and alignment of the former modules 42. At 172, the former module 42 is taught the position of the inner chord clamp relative to the tool 48, and at 174 the position of the nosepiece relative to the tool 48 is learned. At 176, the servo-motors 94 (FIG. 6) and the encoders 96 are used to initially learn the shape of the tool, and then to relearn the surface of the laminated plies 46 as each of the plies 46 is laid up.

Figure 16:
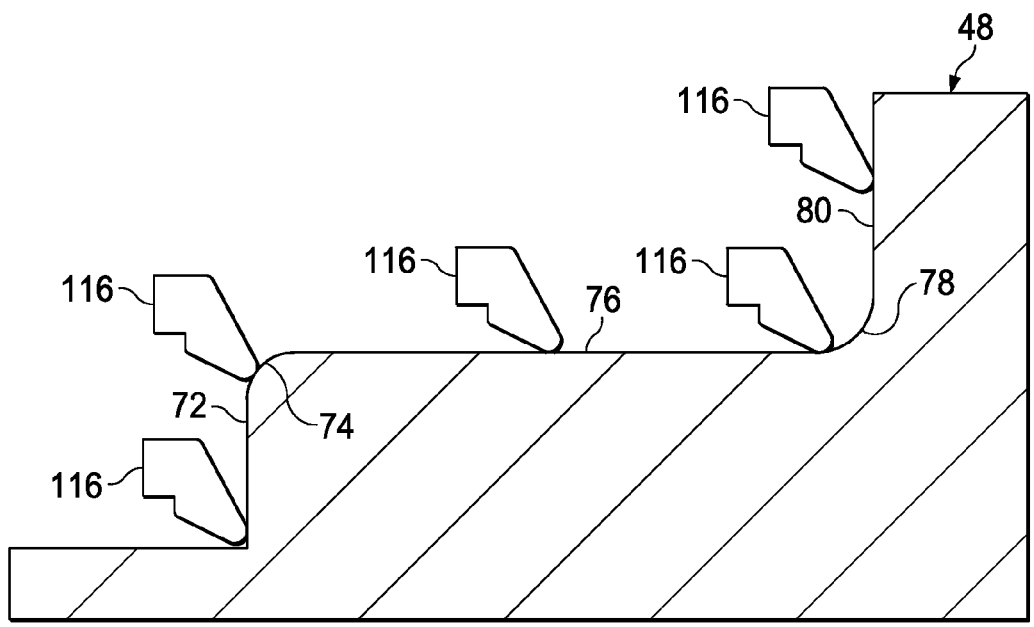
FIG. 16 is an end view of the tool shown in FIG. 5, illustrating the progressive movement of the nosepiece during the set up and teaching phase shown in FIG. 15.
Figure 17:
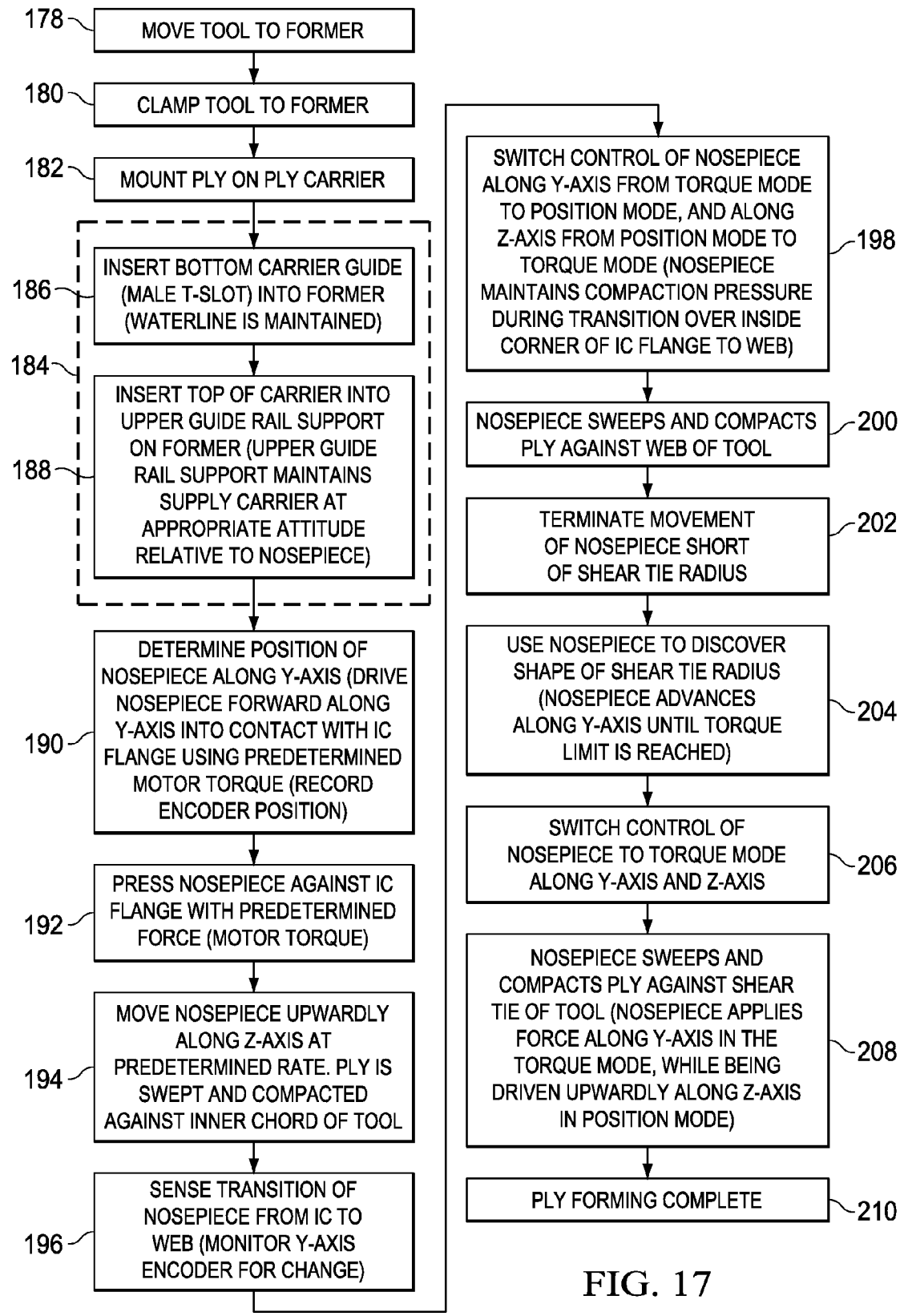
FIG. 17 is illustration of a flow diagram of an adaptive control method employed by each of the fabrication modules

Attention is now directed to FIGS. 16 and 17 which illustrate additional details of the disclosed forming method. Beginning at 178 (FIG. 17), the tool 48 is moved into proximity to the former 40, and at 180, the tool 48 is clamped to the former 40. At 182, one or more plies 46 are mounted on the ply carrier 84. At 184, the ply carrier 84 having the ply 46 mounted thereon is loaded onto the former 40. This loading process is performed by inserting the lower carrier guide 142 into the former 40 at 186, and at step 188, inserting the upper guide 140 into the upper guide rail track, such as carrier support track 120, on the former 40. At 190, the position of the nosepiece 116 along the Y-axis is determined by driving the nosepiece 116 forward along the Y-axis into contact with the inner chord tool flange 72 using a predetermined motor torque. An encoder 96 coupled with the servo-motor 94 is read to indicate the position of the nosepiece 116. At 192, the nosepiece 116 is pressed against the inner chord flange with a predetermined amount of force. At 194, the nosepiece 116 is moved upwardly along the Z-axis at a predetermined rate. The ply 46 is swept and compacted against the surface of inner chord tool flange 72, at step 194.

At 196, the transition of the nosepiece 116 from the inner chord tool flange 72 to the web tool surface 76 is sensed by monitoring a Y-axis encoder 96 for a change. At 198 control of the nosepiece 116 along the Y-axis is switched from a torque mode to a position mode, and along the Z-axis from a position mode to a torque mode. The nosepiece 116 maintains compaction pressure against the ply 46 during the transition over the inside corner of the inner chord tool radius 74. At 200, the nosepiece 116 sweeps and compacts the ply against the web tool surface 76 on the tool 48. At 202, movement of the nosepiece 116 is terminated when the nosepiece 116 is a short distance from the shear tie radius 78. At 204, the nosepiece 116 is used to "discover" the shape of the shear tie radius 78. This is accomplished by advancing the nosepiece 116 along the Y-axis until a preselected torque limit is reached. At step 206, control of the nosepiece 116 is switched to the torque mode along the Y-axis and along the Z-axis. At 208, the nosepiece 116 sweeps and compacts apply against the shear tie tool surface 80. During this step, the nosepiece 116 applies force along the Y-axis in the torque mode, while being driven upwardly along the Z-axis in the position mode. At step 210 the ply forming process is complete and steps 182-208 may be repeated to layup, form and compact additional plies.

Embodiments of the disclosure may find use in a variety of potential applications, particularly in the transportation industry, including for example, aerospace, marine, automotive applications and other application requiring automated fabrication of a variety of parts within a family of parts having common features or characteristics. Thus, referring now to FIGS. 18 and 19, embodiments of the disclosure may be used in the context of an aircraft manufacturing and service method 212 as shown in FIG. 18 and an aircraft 214 as shown in FIG. 19. Aircraft applications of the disclosed embodiments may include, for example, without limitation, fuselage frame sections, spars, stringers and other structural members, to name only a few. During pre-production, exemplary method 212 may include specification and design 216 of the aircraft 214 and material procurement 218. During production, component and subassembly manufacturing 220 and system integration 222 of the aircraft 214 takes place. Thereafter, the aircraft 214 may go through certification and delivery 224 in order to be placed in service 226. While in service by a customer, the aircraft 214 is scheduled for routine maintenance and service 228, which may also include modification, reconfiguration, refurbishment, and so on.

Each of the processes of method 212 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 214 produced by exemplary method 212 may include an airframe 230 with a plurality of systems 232 and an interior 234. Examples of high-level systems 232 include one or more of a propulsion system 236, an electrical system 238, a hydraulic system 240, and an environmental system 242. Any number of other systems may be included. Although an aerospace example is shown, the principles of the disclosure may be applied to other industries, such as the marine and automotive industries.

Systems and methods embodied herein may be employed during any one or more of the stages of the production and service method 212. For example, components or subassemblies corresponding to production process 220 may be fabricated or manufactured in a manner similar to components or subassemblies produced while the aircraft 214 is in service. Also, one or more apparatus embodiments, method embodiments, or a combination thereof may be utilized during the production stages 220 and 222, for example, by substantially expediting assembly of or reducing the cost of an aircraft 214. Similarly, one or more of apparatus embodiments, method embodiments, or a combination thereof may be utilized while the aircraft 242 is in service, for example and without limitation, to maintenance and service 228.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus for fabricating each of a plurality of differing laminate structures in a family of structures having common features, comprising:
   a plurality of separate fabrication modules each locally adapted to fabricate a section of the laminate structure on a corresponding tool, the fabrication modules being reconfigurable to fabricate each of the laminate structures in the family thereof, wherein each of the fabrication modules includes a track in which a portion of a forming member is local mounted;
   the forming member adapted for forming laminate plies over the tool, the forming member extending along a length of the fabrication modules, portions of the forming member being mounted on each of the fabrication modules for movement over the tool along at least two axes, wherein the forming member is removably mounted in the tracks to allow interchangeability of a plurality of forming members respectively having different shapes; and
   a controller for controlling and coordinating automated operation of the fabrication modules.

2. The apparatus of claim 1, wherein the forming member is continuous along the length of the fabrication modules.

3. The apparatus of claim 1, wherein the forming member is adapted to sweep laminate plies over the tool, and includes compliance.

4. The apparatus of claim 1, wherein each of the fabrication modules includes a clamp adapted for clamping a portion of a laminate ply against a portion of the tool.

5. The apparatus of claim 1, wherein each of the fabrication modules includes a powered drive coupled with the forming member for sweeping the forming member over the laminate plies and compacting laminate plies on the tool.

6. The apparatus of claim 1, further comprising:
   a flexible ply carrier adapted to hold at least one laminate ply thereon, and
   wherein each of the fabrication modules includes a pair of spaced apart tracks adapted to releasably hold the ply carrier, and a ply carrier control assembly for holding the ply carrier in tension as the forming member forms the ply over the tool.

7. The apparatus of claim 6, wherein:
   the forming member is engageable with the ply carrier to sweep the ply carrier along with the ply thereon over the tool, and
   the ply carrier control assembly includes drives for adjusting a position of the ply carrier along two axes.

8. The apparatus of claim 1, wherein each of the fabrication modules further includes:
   a force sensor for sensing a level of force applied to the laminate plies by the forming member, and
   a position sensor for sensing the position of the forming member.

9. The apparatus of claim 1, wherein each of the fabrication modules includes a clamp for clamping the fabrication module to the tool.

10. The apparatus of claim 1, further comprising:
    linkage between the fabrication modules for rigidly coupling the fabrication modules together and for aligning the fabrication modules relative to the tool.

11. The apparatus of claim 1, wherein the fabrication modules are substantially identical and interchangeable with each other.

12. The apparatus of claim 1, further comprising a central controller for controlling and coordinating the operation of the fabrication modules to collectively fabricate the laminate structure.

13. A method of fabricating each of a plurality of differing parts in a family of parts having common features, wherein each of the parts is fabricated using a unique tool, comprising:
    arranging a plurality of separate, substantially identical fabrication modules to substantially match a tool on which one of the parts is to be fabricated, wherein each of the fabrication modules includes a track;
    locally mounting portions of a forming member within the track along substantially the entire length of the fabrication modules, the portions of the forming member being mounted on each of the fabrication modules for movement over the tool along at least two axes, wherein the forming member is removably mounted in the tracks to allow interchangeability of a plurality of forming members respectively having different shapes;
    adapting each of the fabrication modules to a local section of the tool; and,
    controlling and coordinating operation of the fabrication modules to fabricate portions of the part over a corresponding section of the tool.

14. The method of claim 13, wherein arranging the fabrication modules includes:
    moving each of the fabrication modules into proximity to the tool, and
    rigidly linking the fabrication modules together.

15. The method of claim 13, further comprising:
    clamping each of the fabrication modules to the tool.

16. The method of claim 13, wherein adapting the each of the fabrication modules includes learning, by each of the fabrication modules, the location of surfaces on the tool on which the part is to be fabricated.

17. The method of claim 16, further comprising:
    sweeping materials across the surfaces of the tool using the forming member, and
    using the forming member to learn the location of the surfaces on the tool.

18. The method of claim 17, wherein learning the location of the surfaces includes:
    sensing a position of the forming member as the forming member sweeps materials across the surfaces of the tool, and
    recording the sensed position of the forming member.

19. The method of claim 13, wherein adapting each of the fabrication modules includes adjusting the elevation of the fabrication modules to a common waterline.

20. The method of claim 13, wherein the step of locally mounting portions of the forming member within the track along substantially the entire length of the fabrication modules further comprises:
    forming a continuous spline defined by the forming member along all of the fabrication modules.

21. The method of claim 13, wherein:
    each of the fabrication modules is a laminate ply former module, and
    arranging the fabrication modules includes linking the fabrication modules together to form a single laminate ply former.

22. An apparatus for fabricating each of a plurality of differing laminate structures in a family of structures having common features, comprising:
    a flexible ply carrier adapted to hold at least one laminate ply thereon;
    a plurality of separate fabrication modules each locally adapted to fabricate a section of the laminate structure on a corresponding tool, wherein each of the fabrication modules includes a pair of spaced apart tracks adapted to releasably hold the ply carrier, the fabrication modules being reconfigurable to fabricate each of the laminate structures in the family thereof;
    a forming member adapted for forming laminate plies over the tool, the forming member extending along a length of the fabrication modules, portions of the forming member being mounted on each of the fabrication modules for movement over the tool along at least two axes;
    a ply carrier control assembly for holding the ply carrier in tension as the forming member forms the ply over the tool; and
    a controller for controlling and coordinating automated operation of the fabrication modules.

23. The apparatus of claim 22, wherein the forming member is continuous along the length of the fabrication modules.

24. The apparatus of claim 23, wherein each of the fabrication modules includes a track in which a portion of the forming member is locally mounted.

25. The apparatus of claim 24, wherein the forming member is removably mounted in the tracks to allow interchangeability of a plurality of forming members respectively having different shapes.

26. The apparatus of claim 22, wherein the forming member is adapted to sweep laminate plies over the tool, and includes compliance.

27. The apparatus of claim 22, wherein each of the fabrication modules includes a clamp adapted for clamping a portion of a laminate ply against a portion of the tool.

28. The apparatus of claim 22, wherein each of the fabrication modules includes a powered drive coupled with the forming member for sweeping the forming member over the laminate plies and compacting laminate plies on the tool.

29. The apparatus of claim 22, wherein:
    the forming member is engageable with the ply carrier to sweep the ply carrier along with the ply thereon over the tool, and
    the ply carrier control assembly includes drives for adjusting a position of the ply carrier along two axes.

30. The apparatus of claim 22, wherein each of the fabrication modules further includes:
    a force sensor for sensing a level of force applied to the laminate plies by the forming member, and
    a position sensor for sensing the position of the forming member.

31. The apparatus of claim 22, wherein each of the fabrication modules includes a clamp for clamping the fabrication module to the tool.

32. The apparatus of claim 22, further comprising:
    linkage between the fabrication modules for rigidly coupling the fabrication modules together and for aligning the fabrication modules relative to the tool.

33. The apparatus of claim 22, wherein the fabrication modules are substantially identical and interchangeable with each other.

34. The apparatus of claim 22, further comprising a central controller for controlling and coordinating the operation of the fabrication modules to collectively fabricate the laminate structure.

35. A method of fabricating each of a plurality of differing parts in a family of parts having common features, wherein each of the parts is fabricated using a unique tool, comprising:
    arranging a plurality of separate, substantially identical fabrication modules to substantially match a tool on which one of the parts is to be fabricated, wherein each of the fabrication modules includes a pair of spaced apart tracks, the tracks having a ply carrier held thereon;
    locally mounting portions of a forming member within the track along substantially the entire length of the fabrication modules, the portions of the forming member being mounted on each of the fabrication modules for movement over the tool along at least two axes;
    adapting each of the fabrication modules to a local section of the tool; and,
    holding the ply carrier in tension on the tracks while the forming member forms a ply over the tool;
    controlling and coordinating operation of the fabrication modules to fabricate portions of the part over a corresponding section of the tool.

36. The method of claim 35, wherein arranging the fabrication modules includes:
    moving each of the fabrication modules into proximity to the tool, and
    rigidly linking the fabrication modules together.

37. The method of claim 35, further comprising:
    clamping each of the fabrication modules to the tool.

38. The method of claim 35, wherein adapting the each of the fabrication modules includes learning, by each of the fabrication modules, the location of surfaces on the tool on which the part is to be fabricated.

39. The method of claim 38, further comprising:
    sweeping materials across the surfaces of the tool using the forming member, and
    using the forming member to learn the location of the surfaces on the tool.

40. The method of claim 39, wherein learning the location of the surfaces includes:
    sensing a position of the forming member as the forming member sweeps materials across the surfaces of the tool, and
    recording the sensed position of the forming member.

41. The method of claim 35, wherein adapting each of the fabrication modules includes adjusting the elevation of the fabrication modules to a common waterline.

42. The method of claim 35, wherein the step of locally mounting portions of the forming member within the track along substantially the entire length of the fabrication modules further comprises:
    forming a continuous spline defined by the forming member along all of the fabrication modules.

43. The method of claim 35, wherein:
    each of the fabrication modules is a laminate ply former module, and
    arranging the fabrication modules includes linking the fabrication modules together to form a single laminate ply former.

* * * * *